United States Patent Office 3,231,750
Patented Jan. 25, 1966

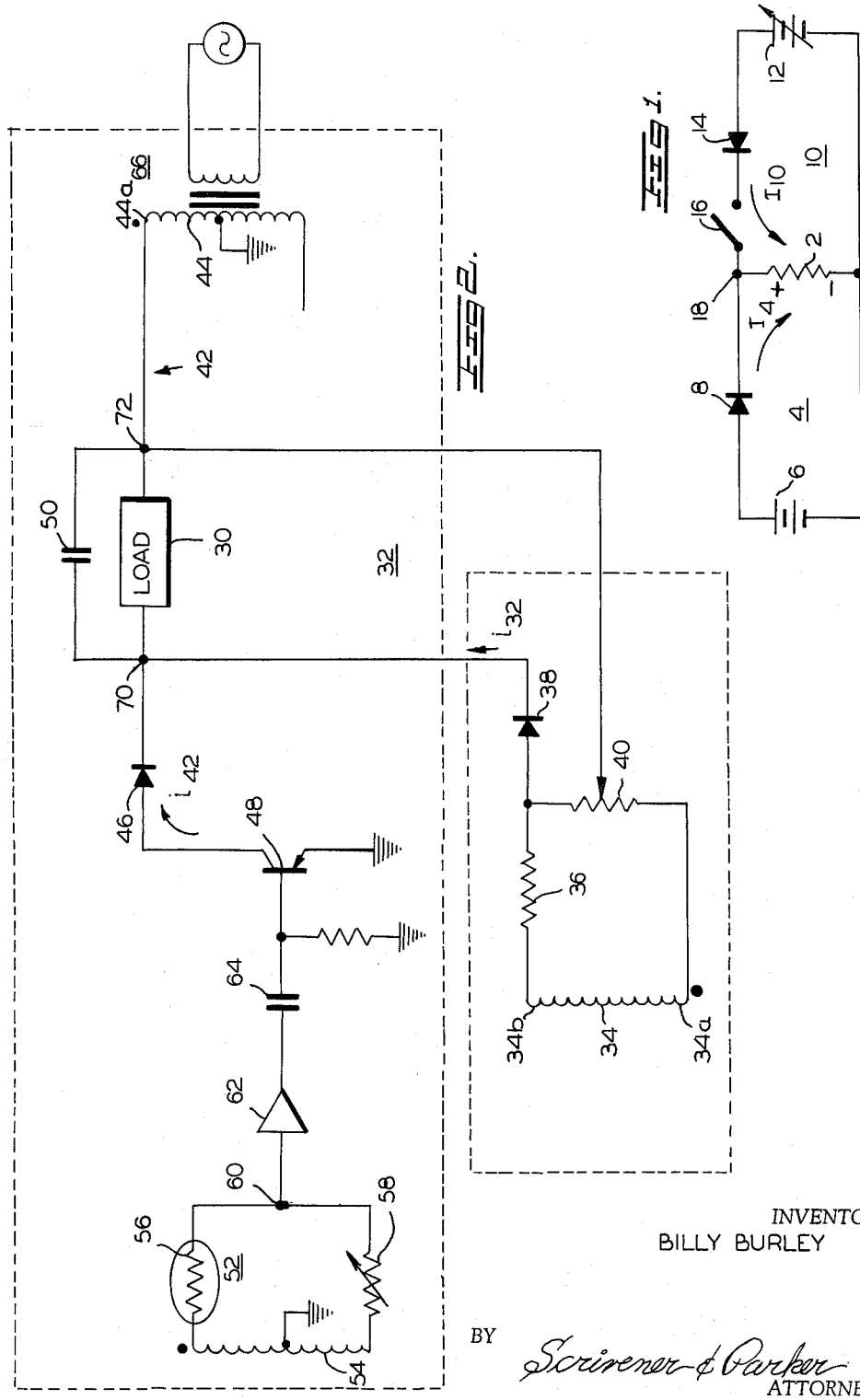

3,231,750
CONDITION-RESPONSIVE ELECTRONIC CONTROL AFFORDING CONTINUOUS ENERGIZATION
Billy Burley, Dallas, Tex., assignor, by mesne assignments, to Johnson Service Company, Milwaukee, Wis., a corporation of Wisconsin
Filed June 29, 1962, Ser. No. 206,351
4 Claims. (Cl. 307—39)

This invention relates to an electronic control system which normally supplies an electrical load with a given level of biasing current and which, under certain conditions, affords modulating control over the load as a function of the deviation of a sensed condition from a predetermined value.

Condition-responsive electronic controls have been disclosed in the prior art which supply current to a load as a function of the deviation of a sensed condition from a predetermined value. In heating and air conditioning systems, the electrical load may comprise an electro-mechanical actuator which operates a regulating valve or the like arranged in a conduit supplying a temperature-modifying medium. Quite often the actuator is a single-acting device which is spring-biased toward a given end position of travel. Thus when the electrocnic control is de-activated, the regulating valve is spring-biased toward a fully closed or a fully open position. In certain instances it may be desirable to continuously supply the electro-mechanical actuator with a minimum level of biasing current so that the regulating valve will normally assume an intermediate throttling position between the fully-open and fully-closed positions. When the magnitude of the deviation of a condition from a predetermined value exceeds a given level, it may be desirable to operate the valve in modulating response to the condition deviation.

A primary object of the present invention is to provide an electronic control system including a pair of load circuit means each of which includes a voltage source for supplying current to a single load, and means for de-activating one of said load circuit means when the effective load potential thereof is below the corresponding load potential developed by the other load circuit means.

Another object of the invention is to provide an electronic control system which is operable to supply a load with a first current the effective level of which is a function of the deviation of a measured condition from a predetermined value and which is operable—when the level of the first current falls below a predetermined value—to supply a second current having a level equal to said minimum value.

A more specific object of the invention is to provide an electronic control system comprising a pair of load circuit means for supplying current to a common load, each of said load circuit means including a voltage source and a diode connected in series with the load, said sources and said diodes being connected in opposition, respectively, relative to the load. In accordance with the present invention, one of the load circuit means includes condition-responsive current regulating means for controlling the voltage drop developed across the load by that circuit. The other load circuit means produces a constant voltage drop across the load. Consequently, when the voltage drop developed by one load circuit is lower than that developed by another, the diode of the lower load voltage circuit is reverse-biased and the circuit is de-activated. As a consequence of the invention, modulating control over the load is obtained for condition deviations above a given magnitude, and a given level of biasing current is supplied to the load during the remainder of the time. In accordance with an alternating-current embodiment of the invention, the condition-responsive means assumes modulating control over the load only for deviations in one sense from a predetermined value and only for deviations above a given magnitude.

Other objects and advantages of the invention will become apparent from a study of the following specification when considered in conjunction with the accompanying drawing, in which:

FIG. 1 is a simplified schematic diagram illustrating the basic operation of the electronic control; and FIG. 2 is a circuit diagram of a condition-responsive alternating-current embodiment of the invention.

Referring to FIG. 1, current-responsive load 2 is connected in series in a first load circuit 4 including fixed D.-C. voltage source 6 and diode rectifier 8. Load 2 is also connected in series in a second load circuit 10 including variable D.-C. voltage source 12, diode 14 and switch 16. Sources 6 and 12 and diodes 8 and 14 are connected in opposition, respectively, relative to the load whereby the respective load circuit currents $I_4$ and $I_{10}$ flow in the same direction through load 2.

Assuming that both diodes are prefect diodes (i.e., that no reverse current can flow through either diode) and that the voltage of source 6 equals that of source 12, when switch 16 is closed, equal load circuit currents $I_4$ and $I_{10}$ will flow through the load as shown. Assume, however, that the voltage of source 6 is greater than that of source 12. The potential of load junction 18 is now greater than that of source 12 and consequently diode 14 becomes reverse-biased to interrupt the flow of current $I_{10}$ in load circuit 10. Only current $I_4$ flows through load 2.

On the other hand, if the voltage of source 12 should exceed that of source 6, the potential of junction 18 exceeds that of source 6 and diode 8 becomes reverse-biased. The flow of current $I_4$ through load 2 is interrupted (i.e., load circuit 4 is de-activated) and only the current $I_{10}$ of load circuit 10 flows through the load.

Referring now to FIG. 2, current-responsive load 30, which comprises, for example, a servo-valve of a hydraulic actuator similar to that shown in my copending patent application Serial No. 123,809 filed July 13, 1961, and entitled, "Hydraulic Actuator," is connected in series in a first load circuit 32 including alternating-current voltage source 34, fixed resistor 36, diode 38, and potentiometer 40. Load 30 is also connected in series in a second load circuit 42 including A.-C. source 44, diode 46, and the emitter to collector circuit of transistor 48. The cathodes of diodes 38 and 46 are connected with the load as shown. Smoothing capacitor 50 is connected in parallel with load 30. Condition-responsive bridge network 52, which includes a grounded center-tapped energizing winding 54 connected in series with condition-responsive element 56 (for example, a thermistor) and a variable resistor 58, has an output junction 60 connected with the base electrode of transistor 48 via amplifier 62 and capacitor 64. The details of condition-responsive load circuit 42 are illustrated and described in my companion patent application Serial No. 206,348 filed June 29, 1962, and entitled, "Condition-Responsive Electronic System." Source 44 comprises the grounded center-tapped secondary winding of power transformer 66. Diode 46 isolates the positive half-cycles of reference voltage supplied by winding 44 from the collector electrode of transistor 48. Negative half-cycles of the reference voltage are applied to the collector of transistor 48 via diode 46, and when the transistor is conductive, pulsating D.-C. current $i_{42}$ flows in load circuit 42. This pulsating current has an effective D.-C. level which causes a voltage drop across load 30.

Winding 34, which may comprise the secondary winding of a transformer, not shown, is energized in such a manner that winding ends 34a and 44a have the same instantaneous polarity. Diode 38 isolates load 30 from the negative half-cycles of biasing voltage appearing at winding end 34b. Positive half-cycles of the A.-C. biasing voltage appearing at winding end 34b are conducted to winding end 34a via resistor 36, diode 38, load 30, the adjustable tap of potentiometer 40, and potentiometer 40. This pulsating D.-C. current $i_{32}$ has an effective D.-C. level which also causes an IR drop across load 30. Bridge energizing winding 54, which may comprise the secondary winding of a transformer, not shown, is energized in such a manner that winding ends 34a and 44a have the same instantaneous polarity. The load circuits 32 and 42 of the FIG. 2 embodiment correspond with load circuits 4 and 10, respectively, of the FIG. 1 embodiment.

Operation

Assume that potentiometer 40 is set to cause a given current $i_{32}$ to flow through current-responsive load 30. Assume also that transistor 48 is biased to cut-off, that bridge 52 is temperature-responsive, and that resistor 58 is set to establish a balanced bridge condition when room temperature equals 75° F.

Thus, when room temperature equals 75° F., bridge 52 is balanced, transistor 48 is non-conductive, load circuit 42 is de-energized, and load circuit 32 supplies current to load 30 having a magnitude that is a function of the setting of potentiometer 40. The load current of circuit 32 establishes a fixed voltage drop across load 30, and load junction 70 has a fixed potential relative to load junction 72.

Assume now that sensed temperature deviates in one sense (for example, above) the predetermined value established by resistor 58. A signal voltage is produced at junction 60 that has a given phase relationship relative to the reference voltage produced by winding 44 and a magnitude that is a function of the degree of condition deviation. This signal voltage is amplified by amplifier 62 and is applied to the base electrode of transistor 48 via capacitor 64. Assuming that the phase relationship between the amplified signal voltage and the negative half-cycles of reference voltage applied to the collector of transistor 48 via diode 46 is such as to prevent conduction of the transistor, load circuit 42 remains de-activated and only the current of circuit 32 flows through load 30.

Assume, however, that the sensed temperature deviates in the opposite sense from the predetermined value. For example, if sensed temperature should equal 74° F., a signal voltage of the opposite phase is developed at junction 60. This signal voltage, which has a magnitude that is a function of the 1° deviation in temperature, is amplified and is applied to the base electrode of transistor 48. The phase relationship between amplified signal voltage and the negative half-cycles of the reference voltage is now such as to permit conduction of transistor 48. Assume, however, that the electronic system is so calibrated that upon the application of an amplified 1° deviation signal voltage to the base electrode of transistor 48, the collector potential is less than the potential established at junction 70 by load circuit 32. Under these conditions, diode 46 is reverse-biased and load circuit 42 remains de-activated. Only the current of load circuit 32 flows through load 30.

Assume now that the sensed temperature equals 73° and that the system calibration is such that the potential of the collector electrode is greater than that of junction 70. If the load currents of circuits 32 and 42 are equal at this time, the two voltage drops across load 30 are equal, both diodes are conductive, and both load currents flow through the load. If sensed temperature should fall to 72°, the magnitude of the amplified signal voltage applied to the base of transistor 48 will increase, the impedance of transistor 48 will decrease, the load current of load circuit 42 will increase, the voltage drop across load 30 will increase, diode 38 will be reverse-biased, load circuit 32 will be de-activated, and the condition-responsive load circuit 42 will assume complete modulating control over the load. Load circuit 42 will retain modulating control over load 30 for sensed temperatures below 72° (depending on the operating range of the electronic control).

Upon increase of sensed temperature to 73°, both diodes become conductive and equal currents flow through the respective load circuits. Upon further increase of sensed temperature to 74°, diode 46 becomes reverse-biased to de-activate condition-responsive load circuit 42. Load 30 now senses only the biasing current of load circuit 32, the level of said biasing current being a function of the setting of potentiometer 40.

It is apparent that for condition deviations in one sense from a predetermined value and above a predetermined magnitude, modulating control over load 30 is achieved as a function of the degree of condition deviation. For condition deviations below the predetermined magnitude or for deviations in the opposite sense from the predetermined value, a given load current (determined by the setting of potentiometer 40) is supplied to the load. By following the teachings of my companion application Serial No. 206,343 filed June 29, 1962 and entitled, "Electronic System Affording Reversible Modulating Control," the phase relationship between windings 54 and 44 may be reversed to reverse the sense of response of the electric control of the present invention.

Condition-responsive bridge 52 may be of the variable resistance, capacitance, inductance or impedance type responsive to conditions such as temperature, pressure, humidity or the like. Furthermore, other means (for example, differential transformer means) may be substituted for the condition-responsive bridge for applying signal voltages of opposite phase relationships and condition-responsive magnitudes upon the base electrode of transistor 48. Moreover, other condition-responsive current regulating means may be substituted for the illustrated transistor means of FIG. 2. Other changes and modifications may be made in the apparatus described without deviating from the invention set forth in the following claims.

What is claimed is:

1. A condition-responsive control system, comprising a current-responsive load having a pair of terminals; a constant first source of alternating-current voltage; first load circuit means including a first uni-directionally conductive device for connecting said first voltage source across said load terminals; a second source of alternating-current voltage; current-controlling means including a pair of power circuit electrodes and a control electrode; second load circuit means including a second uni-directionally conductive device for connecting said power circuit electrodes in series with said second voltage source across said load terminals, said first and second voltage sources having the same frequency and the same instantaneous phase relationship relative to one of said load terminals, and second device having a polarity permitting conduction of said current-controlling means, both of said devices having the same polarity relative to one of said load terminals; and condition-responsive bridge network means connected with said control electrode for controlling the current in said second load circuit means in accordance with the deviation of a condition from a predetermined value, said bridge network means including a network energizing winding, and means energizing said winding with an alternating-current voltage having the same frequency as and a given phase relationship relative to said sources, whereby for current flow in said second load circuit means greater than in said first load circuit means the load current is a function of condition deviation from a given value, and for current flow in said second load circuit means less than in said first load circuit means, the load current is a constant value dependent upon the voltage of said first source.

2. Apparatus as defined in claim 1 wherein said current-controlling means comprises a transistor the emitter and collector electrodes of which constitute said power circuit electrodes and the base electrode of which constitutes said control electrode.

3. Apparatus as defined in claim 1 wherein condition-responsive bridge network means includes an output terminal connected with said control electrode, and first and second branches each connected at one end with said output terminal and at the other end with opposite ends of said energizing winding, repsectively, said first branch including condition-responsive means having an electrical characteristic that varies in accordance with the deviation of a condition from a pretermined value, and said second branch includes a balancing element having the same electrical characteristic.

4. Apparatus as defined in claim 3 wherein said balancing element is adjustable, and further including means for adjusting the voltage value of said first voltage source.

References Cited by the Examiner
UNITED STATES PATENTS

| | | | |
|---|---|---|---|
| 2,585,005 | 2/1952 | Godshalk et al. | 323—75 |
| 2,712,065 | 6/1955 | Elbourn et al. | 307—87 |
| 2,782,303 | 2/1957 | Goldberg | 307—130 |
| 2,907,932 | 10/1959 | Patchell | 317—148.5 |

LLOYD McCOLLUM, *Primary Examiner.*